United States Patent
Griffin et al.

(10) Patent No.: US 7,262,154 B2
(45) Date of Patent: *Aug. 28, 2007

(54) METHODS AND COMPOSITIONS FOR BREAKING VISCOSIFIED FLUIDS

(75) Inventors: David E. Griffin, Duncan, OK (US);
Richard W. Pauls, Duncan, OK (US);
Robert E. Hanes, Jr., Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 175 days.

This patent is subject to a terminal disclaimer.

(21) Appl. No.: 10/447,814

(22) Filed: May 29, 2003

(65) Prior Publication Data

US 2004/0242430 A1    Dec. 2, 2004

(51) Int. Cl.
*C09K 8/52* (2006.01)

(52) U.S. Cl. .......... 507/209; 507/211; 507/213; 507/215; 507/216; 507/269; 507/273; 507/277; 507/921; 507/922; 166/308.3

(58) Field of Classification Search .......... 507/209, 507/211, 213, 215, 216, 269, 273, 277, 921, 507/922; 166/308.3
See application file for complete search history.

(56) References Cited

U.S. PATENT DOCUMENTS

| | | | | |
|---|---|---|---|---|
| 3,714,088 A * | 1/1973 | Manning | .......... | 523/202 |
| 3,760,881 A | 9/1973 | Kiel | .......... | 166/308 |
| 4,144,179 A | 3/1979 | Chatterji | .......... | 252/8.55 R |
| 4,552,215 A | 11/1985 | Almond et al. | .......... | 166/278 |
| 4,552,674 A | 11/1985 | Brown et al. | .......... | 252/8.55 R |
| 5,420,174 A | 5/1995 | Dewprashad | .......... | 523/130 |
| 5,445,223 A * | 8/1995 | Nelson et al. | .......... | 166/308.5 |
| 5,877,127 A * | 3/1999 | Card et al. | .......... | 507/273 |
| 6,559,302 B1 * | 5/2003 | Shah et al. | .......... | 536/124 |
| 6,617,285 B2 * | 9/2003 | Crews | .......... | 507/201 |
| 2002/0168397 A1 * | 11/2002 | Tsuji et al. | .......... | 424/439 |
| 2003/0022796 A1 * | 1/2003 | Crews | .......... | 507/266 |
| 2003/0092581 A1 * | 5/2003 | Crews | .......... | 507/100 |
| 2003/0092584 A1 * | 5/2003 | Crews | .......... | 507/200 |
| 2003/0096025 A1 * | 5/2003 | Uehara et al. | .......... | 424/729 |
| 2003/0119678 A1 * | 6/2003 | Crews | .......... | 507/100 |
| 2004/0019199 A1 * | 1/2004 | Crews | .......... | 536/124 |
| 2004/0127367 A1 * | 7/2004 | Crews | .......... | 507/100 |
| 2004/0242430 A1 | 12/2004 | Griffin et al. | .......... | 507/100 |

FOREIGN PATENT DOCUMENTS

EP    1 267 034 A2    12/2002
EP    1 559 867 A1    8/2005

OTHER PUBLICATIONS

Foreign communication from a related counterpart application dated Aug. 18, 2004.
Foreign communication from a related counterpart, Search Report and Written Opinion Application No. PCT/GB2005/69 dated Feb. 22, 2006.

* cited by examiner

*Primary Examiner*—Philip C. Tucker
(74) *Attorney, Agent, or Firm*—Robert A. Kent; Baker Botts

(57) ABSTRACT

Improved methods for treating and for fracturing subterranean formations and the fluid compositions are provided. The viscosity of a treating fluid containing gelling agents is broken, even at temperatures of about 250° F. and lower, utilizing an oxidizing breaker and a reducing sugar to activate the breaker.

41 Claims, No Drawings

METHODS AND COMPOSITIONS FOR BREAKING VISCOSIFIED FLUIDS

BACKGROUND OF THE INVENTION

1. Field of the Invention

This invention relates to methods and compositions for treating subterranean formations, and more specifically, to methods and compositions for breaking viscosified fluids utilized in the treatment of subterranean formations.

2. Description of the Prior Art

It is common practice to treat subterranean formations to increase the permeability or conductivity of such formations by procedures that are identified generally as fracturing processes. For example, it is a conventional practice to hydraulically fracture a well in order to produce one or more cracks or "fractures" in the surrounding formation by mechanical breakdown of the formation. Fracturing may be carried out in wells that are completed in subterranean formations for virtually any purpose. The usual candidates for fracturing, or other stimulation procedures, are production wells completed in oil and/or gas containing formations. However, disposal wells and injection wells used in secondary or tertiary recovery operations, for example, for the injection of water or gas, may also be fractured in order to facilitate the injection of fluids into such subterranean formations.

Hydraulic fracturing is accomplished by injecting a hydraulic fracturing fluid into the well and applying sufficient pressure on the fracturing fluid to cause the formation to break down with the attendant production of one or more fractures. Usually a gel, an emulsion or a foam having a proppant such as sand or other particulate material suspended therein is introduced into the fractures. The proppant is deposited in the fractures and functions to hold the fractures open after the pressure is released and the fracturing fluid flows back to the surface. The fracturing fluid has a sufficiently high viscosity to retain the proppant in suspension or at least to reduce the tendency of the proppant to settle out of the fracturing fluid as the fracturing fluid flows along the created fracture. Generally, a viscosifier such as a polysaccharide gelling agent is used to gel the fracturing fluid to provide the high viscosity needed to realize the maximum benefits from the fracturing process.

After the high viscosity fracturing fluid has been pumped into the formation and fracturing of the formation has occurred, it is desirable to remove the fluid from the formation to allow hydrocarbon production through the new fractures. Generally, the removal of the highly viscous fracturing fluid is realized by "breaking" the gel or in other words, by converting the fracturing fluid into a low viscosity fluid. Breaking the gelled fracturing fluid has commonly been accomplished by adding a "breaker," that is, a viscosity-reducing agent, to the fracturing fluid prior to pumping into the subterranean formation.

Oxidizing breakers such as peroxides, persulfates, perborates, oxyacids of halogens and oxyanions of halogens, are used to break aqueous based fracturing or treating fluids at temperatures above 250° F. by oxidative depolymerization of the polymer backbone. However, in some temperature regimes these oxidizing agents can be generally ineffective for breaking the viscosity within a reasonable time period. For example, when using a chlorous acid oxidizing breaker below about 250° F., an activator is required to break the polymer in a timely fashion. Cupric ion chelated with ethylenediaminetetraacetic acid (EDTA) can provide the necessary activation; however, future use of transition metal ions, especially in oceanic drilling sites, may become less environmentally acceptable.

Thus, it is desirable to provide environmentally benign activators which will allow chlorous acid and other oxidizing breakers to be effectively utilized to provide controlled breaks of viscosified fluids at temperatures below about 250° F.

SUMMARY OF THE INVENTION

By the present invention, methods of using aqueous treating and fracturing fluids in subterranean formation treatment, and aqueous treating and fracturing fluid compositions are provided which meet the above-described needs and overcome the deficiencies of the prior art. The methods of treating subterranean formations comprise the following steps. An aqueous treating fluid composition is prepared comprising a polysaccharide gelling agent, an oxidizing breaker, a breaker activator comprising a reducing sugar, and water. The aqueous treating fluid is injected into a well bore to treat the subterranean formation.

Methods of forming one or more fractures in a subterranean formation penetrated by a well bore comprise the following steps. An aqueous fracturing fluid composition is prepared comprising a polysaccharide gelling agent, an oxidizing breaker, a breaker activator comprising reducing sugars, and water. The fracturing fluid is introduced into the subterranean zone through the well bore under conditions effective to create at least one fracture therein.

Aqueous treating fluid compositions of this invention for use in treating and fracturing a subterranean formation basically comprise the following: a polysaccharide gelling agent, an oxidizing breaker, a breaker activator comprising reducing sugars, and water.

The objects, features and advantages of the present invention will be readily apparent to those skilled in the art upon a reading of the description of preferred embodiments which follows.

DESCRIPTION OF PREFERRED EMBODIMENTS

Preferred methods of this invention for treating subterranean formations basically comprise the following steps. An aqueous treating fluid composition is prepared comprising a polysaccharide gelling agent, an oxidizing breaker, a breaker activator comprising a reducing sugar, and water. The aqueous treating fluid is injected into a well bore to treat the subterranean formation.

The gelling agent employed in the present invention includes natural, modified and derivatized polysaccharides that are soluble, dispersible or swellable in an aqueous liquid to add viscosity to the liquid. Suitable gelling agents include, but are not limited to, guar, hydroxypropyl guar, carboxymethyl guar, carboxymethylhydroxypropyl guar, xanthan, cellulose, hydroxyethylcellulose and carboxymethylcellulose.

The chemistry and materials involved in the preparation of polysaccharide gelled treating fluids of the type described above are well understood by those skilled in the art. Typically the amount of gelling agent employed in the aqueous treating fluid depends on the viscosity desired. The gelling agent is preferably present in the aqueous treating fluid in an amount in the range of from about 0.1% to about 2% by weight thereof, more preferably from about 0.18% to about 0.95%.

The aqueous treating fluid may include chemicals to further enhance the development of viscosity by cross-linking the gelling agent. Examples of such cross-linking chemicals include borates, zirconium, titanium, aluminum, calcium, magnesium and any of the transition metal ions and organic linkers like glutaraldehyde which are capable of creating a cross-linked structure with the particular gelling agent utilized and are known to those skilled in the art.

The aqueous treating fluid often includes salts such as alkylammonium chlorides, sodium chloride, and potassium chloride and other agents known to those skilled in the art, to minimize the swelling of clays and chances of damage to the subterranean formation. The aqueous treating fluid may also include any of the other conventional additives such as pH control agents, bactericides, clay stabilizers, surfactants and the like which do not adversely react with the other constituents of this invention.

The breaker utilized in the aqueous treating fluid of this invention is an oxidizing breaker including, but not limited to, peroxides, persulfates, perborates, and oxyacids and oxyanions of halogens. Oxyacids and oxyanions of chlorine, for example, are hypochlorous acid and hypochlorites, chlorous acid and chlorites, chloric acid and chlorates, and perchloric acid and perchlorate. Preferably the oxidizing breaker is chlorous acid or hypochlorous acid. Chlorous acid is available commercially under the tradename "VICON™" from Halliburton of Duncan, Okla.

The breaker acts to reduce or "break" the viscosity of the gelled solution. The amount of breaker utilized depends on factors such as the injection time desired, the gelling agent and its concentration, the formation temperature and other factors. The breaker is preferably present in the aqueous treating fluid in an amount in the range of from about 0.005% to about 0.25% by weight thereof. More preferably, to achieve a break in the fluid viscosity in from about 1 to about 24 hours, the breaker concentration is in the range of from about 0.01% to about 0.2%.

Below about 250° F. oxidizing breakers often require activation to operate in a timely fashion. It was discovered that reducing sugars could function to activate the oxidizing breaker. The term "reducing sugar(s)" as utilized in the present invention is defined to include monosaccharide reducing sugars, disaccharide reducing sugars, trisaccharide reducing sugars, tetrasaccharide reducing sugars, pentasaccharide reducing sugars, hexasaccharide reducing sugars, as well as polysaccharides with greater than six repeat units and having reducing sugar end groups. Preferably, the reducing sugar is a monosaccharide, disaccharide or trisaccharide. Specific examples of suitable reducing sugar breaker activators include, but are not limited to, fructose, galactose, glucose, mannose, allose, altrose, idose, talose, gulose, lactose, sorbose, maltose, palatinose, turanose and maltotriose. More preferably, the reducing sugar is fructose, galactose, maltose or lactose, and most preferably fructose or galactose. Fructose, for example, is commercially available from Aldrich of St. Louis, Mo.

The amount of reducing sugar utilized is that amount required to activate the oxidizing breaker. As with the breaker, the amount of reducing sugar utilized depends on factors such as the injection time desired, the gelling agent and its concentration, the formation temperature and other factors. The reducing sugar is preferably present in the aqueous treating fluid in an amount in the range of from about 0.1% to about 100% by weight of oxidizing breaker, more preferably from about 0.5% to about 50%.

The viscosity breaking reaction can be kinetically enhanced further at temperatures as low as about 140° F. by addition of conventional activators to the reducing sugar breaker activator and oxidizing breaker. Such conventional activators include, but are not limited to, cupric ion chelated with ethylenediaminetetraacetic acid (EDTA), aminocarboxylates, diamines and similar compounds familiar to those skilled in the art. When used, the conventional activator is preferably present in the treating fluid composition in an amount in the range of from about 0.01% to about 1% by weight thereof, more preferably from about 0.25% to about 0.4%.

The viscosity breaking reaction can also be kinetically enhanced by addition of iron salts, preferably iron (II) or iron (III) chloride, to the reducing sugar breaker activator and oxidizing breaker. The iron salts have been discovered to catalyze the viscosity breaking reaction. The iron salt catalysts are effective at temperatures as low as about 140° F. and may be added in combination with conventional activators or alone. When used, the iron salt catalyst is preferably present in the treating fluid composition in an amount in the range of from about 0.1 ppm to about 100 ppm.

The water utilized in the aqueous treating fluid compositions of this invention can be fresh water or salt water depending upon the particular density of the composition required. The term "salt water" is used herein to mean unsaturated salt water or saturated salt water including brines and seawater. Generally the water is present in the treating fluid composition in an amount in the range of from about 80% to about 99.5% by weight thereof, more preferably from about 90% to about 99%.

The current invention also provides an improved method of forming one or more fractures in a subterranean formation penetrated by a well bore. This improved method comprises the following steps. An aqueous fracturing fluid composition is prepared comprising a polysaccharide gelling agent, an oxidizing breaker, a breaker activator comprising a reducing sugar, and water. The fracturing fluid has a viscosity suitable for fracturing the formation according to fracturing methods known to those skilled in the art. The fracturing fluid is introduced into the subterranean zone through the well bore under conditions effective to create at least one fracture therein.

A proppant is preferably admixed with the fracturing fluid prior to initiating the fracturing process. When the viscosity of the fracturing fluid is reduced ("broken") sufficiently, the proppant material is deposited in the one or more fractures formed. The proppant material remains holding the fracture (s) open while the fracturing fluid is produced along with formation fluids back to the surface. Preferably, proppants are present in the fracturing fluid composition in an amount in the range of from about 0.5 lb per gallon fracturing fluid to about 25 lb per gallon thereof, and more preferably from about 1 lb per gallon to about 15 lb per gallon.

The aqueous treating fluid compositions of this invention comprise a polysaccharide gelling agent, an oxidizing breaker, a breaker activator comprising a reducing sugar, and water. As will be understood by those skilled in the art, a variety of conventional additives can be included in the aqueous treating fluid composition such as pH control agents, bactericides, clay stabilizers, surfactants and the like which do not adversely react with the other constituents of this invention.

A preferred method of this invention for treating a subterranean formation comprises the following steps: (a) preparing an aqueous treating fluid composition comprising a polysaccharide gelling agent, an oxidizing breaker, a breaker activator comprising a reducing sugar, and water; and (b) injecting the aqueous treating fluid into a well bore to treat the subterranean formation.

An aqueous treating fluid composition of this invention for use in treating subterranean formations penetrated by a well bore comprises a polysaccharide gelling agent, an oxidizing breaker, a breaker activator comprising a reducing sugar, and water.

In order to further illustrate the methods and compositions of this invention, the following examples are given.

EXAMPLE 1

The following set of experiments illustrates the utility of reducing sugars as breaker activators for a gear based fluid at 190° F. using a chlorous acid breaker. Table 1 below lists the viscosity measurements for a viscous guar based fluid alone, with chlorous acid, and with chlorous acid activated by each of the reducing sugars galactose, lactose and fructose. Chlorous acid was added at a dosage of 5 gal/1000 gal of guar-viscosified treating solution and the viscosity was measured over time. The chlorous acid used was VICON™ from Halliburton Energy Services, Inc. of Duncan, Okla. The viscosity values for each sample are reported in Table 1 and the sample compositions are summarized below the table. As can be seen, the chlorous acid is effectively activated by each of the reducing sugars.

TABLE 1

Reducing Sugar Activation of Vicon as Measured by Viscosity (cP) of a Guar Based Treating Fluid at 190° F.

| Elapsed Time, min. | Temp ° F. | SAMPLE | | | | |
|---|---|---|---|---|---|---|
| | | I | II | III | IV | V |
| 0 | 81 | 13 | 15 | 18 | 23 | 20 |
| 30 | 190 | 479 | 433 | 441 | 339 | 283 |
| 60 | 190 | 368 | 277 | 216 | 168 | 101 |
| 90 | 190 | 301 | 208 | 91 | 74 | <26 |
| 120 | 190 | 278 | 145 | 16 | 9 | |
| 150 | 190 | 252 | 100 | 3 | | |
| 180 | 190 | 238 | 48 | | | |

I. Blank (no breaker or activator)
II. 5.0 gal VICON per 1000 gal treating solution
III. 5.0 gal VICON, 2.0 lb galactose per 1000 gal treating solution
IV. 5.0 gal VICON, 1.0 lb lactose per 1000 gal treating solution
V. 5.0 gal VICON, 2.0 lb fructose per 1000 gal treating solution The testing treating fluid used in Table 1 also contained the following chemicals commercially available from Halliburton Energy Services, Inc. of Duncan, Okla.: 25 lb/1000 gal guar gum as WG-19™; 2.5 gal/1000 gal boric acid as BC-140™; 0.1 gal/1000 gal acetic acid as BA-20™; and 2.0 gal/1000 gal alkoxylated nonyl phenol as LoSurf-300™. Viscosity measurements were made at 190° F. and 95 rpm ($81^{-sec}$ shear rate) on a Nordman Instruments 5004 Series, Model 50 viscometer equipped with a B5X bob.

EXAMPLE 2

A second set of experiments, similar to those described in Example 1, was run at 160° F. At this temperature, chlorous acid requires activation to operate in a timely manner. The viscosity measurements are reported in Table 2 and the sample compositions are summarized below the table. The viscosity values displayed in Table 2 illustrate the ability of the reducing sugars to activate the chlorous acid breaker, even at this low temperature. Test VI included diethylene triamine (CAT-4™ available from Halliburton of Duncan, Okla.) as a conventional catayst demonstrating compatibility with the sugar.

TABLE 2

Reducing Sugar Activation of Vicon as Measured by Viscosity (cP) of a Guar Based Treating Fluid at 160° F.

| Elapsed Time, min. | Temp ° F. | SAMPLE | | | | | |
|---|---|---|---|---|---|---|---|
| | | I | II | III | IV | V | VI |
| 0 | 78 | 329 | 1059 | 916 | 869 | 1096 | 1286 |
| 30 | 161 | 591 | 420 | 343 | 271 | 235 | 260 |
| 60 | 161 | 454 | 393 | 289 | 122 | 99 | 114 |
| 90 | 161 | 429 | 347 | 203 | 78 | 71 | 61 |
| 120 | 161 | 419 | 303 | 172 | 57 | 47 | 39 |
| 150 | 161 | 404 | 235 | 144 | 41 | 32 | 28 |
| 180 | 161 | 347 | 203 | 119 | 28 | 22 | 17 |

I. Blank (no breaker or activator)
II. 5.0 gal VICON per 1000 gal treating solution
III. 5.0 gal VICON, 2.0 lb lactose per 1000 gal treating solution
IV. 5.0 gal VICON, 2.0 lb galactose per 1000 gal treating solution
V. 5.0 gal VICON, 2.0 lb fructose per 1000 gal treating solution
VI. 5.0 gal VICON, 2.0 lb fructose and 0.1 gal 10% CAT-4 ™ per 1000 gal treating solution The test treating fluid used in Table 2 also contained the following chemicals: 25 lb/1000 gal guar gum as WG-19™; 2.5 gal/1000 gal boric acid as BC-140™; 0.1 gal/1000 gal acetic acid as BA-20™; and 2.0 gal/1000 gal alkoxylated nonyl phenol as LoSurf-300™. Viscosity measurements were made at 190° F. and 95 rpm ($81^{-sec}$ shear rate) on a Nordman Instruments 5004 Series, Model 50 viscometer equipped with a B5X bob.

EXAMPLE 3

The following experiment illustrates the utility of the reducing sugar galactose along with ferrous chloride catalyst as a breaker activator for a guar based fluid at about 140° F. Chlorous acid was added at a dosage of 5 gal/1000 gal of guar-viscosified treating solution and the viscosity was measured over time. The chlorous acid used was VICON™ from Halliburton Energy Services, Inc. of Duncan, Okla. The viscosity values for each sample are reported in Table 3 and the sample compositions are summarized below the table. Sample I in Table 3 shows that at a temperature of about 140° F., the chlorous acid by itself is not an effective breaker. Similarly, the combinations chlorous acid with iron (II) chloride, iron (II) chloride with galactose, and chlorous acid with galactose produce little break in viscosity. However, as clearly demonstrated by Samples V-VII, iron chloride catalyzes the reaction of chlorous acid and reducing sugar to rapidly break the viscosified fluid.

TABLE 3

Iron Catalysis of Vicon and Reducing Sugar Activator Galactose as Measured by Viscosity (cP) of a Guar Based Treating Fluid

| Elapsed Time, min. | Temp ° F. | SAMPLE I | II | III | IV | V | VI | VII |
|---|---|---|---|---|---|---|---|---|
| 0 | 78 | 1454 | 823 | 1636 | 1032 | 1550 | 656 | 1309 |
| 30 | 141 | 472 | 437 | 467 | 574 | 307 | 251 | 200 |
| 60 | 141 | 511 | 303 | 325 | 554 | 108 | 185 | 11 |
| 90 | 141 | 461 | 272 | 287 | 533 | 50 | 8 | |
| 120 | 141 | 435 | 248 | 259 | 487 | 27 | | |

TABLE 3-continued

Iron Catalysis of Vicon and Reducing Sugar Activator Galactose as Measured by Viscosity (cP) of a Guar Based Treating Fluid

| Elapsed Time, min. | Temp ° F. | SAMPLE | | | | | | |
|---|---|---|---|---|---|---|---|---|
| | | SAMPLE I | II | III | IV | V | VI | VII |
| 150 | 141 | 398 | 234 | 242 | 438 | | | |
| 180 | 141 | 373 | 203 | 210 | 411 | | | |

I. 5.0 gal VICON per 1000 gal treating solution
II. 5.0 gal VICON, 0.08 lb FeCl$_2$ per 1000 gal treating solution
III. 0.32 lb FeCl$_2$, 2.0 lb galactose per 1000 gal treating solution
IV. 5.0 gal VICON, 3.0 galactose per 1000 gal treating solution
V. 5.0 gal VICON, 3.0 galactose, 0.08 lb FeCl$_2$ per 1000 gal treating solution
VI. 5.0 gal VICON, 2.0 galactose, 0.16 lb FeCl$_2$ per 1000 gal treating solution
VII. 5.0 gal VICON, 2.0 galactose, 0.32 lb FeCl$_2$ per 1000 gal treating solution The test treating fluid used in Table 3 also contained the following chemicals commercially available from Halliburton Energy Services, Inc. of Duncan, Okla.: 25 lb/1000 gal guar gum as "WG-19"™; 7.0% KCl; 3.0 gal/1000 gal boric acid as "BC-140"™; 0.05 gal/1000 gal acetic acid as "BA-20"™; and 2.0 gal/1000 gal alkoxylated nonyl phenol as "LOSURF-300"™. Viscosity measurements were made at 160° F. and 95 rpm ($81^{-sec}$ shear rate) on a Nordman Instruments 5004 Series, Model 50 viscometer equipped with a B5X bob.

What is claimed is:

1. A method of treating a subterranean formation comprising:
    providing an aqueous treating fluid composition that comprises a polysaccharide gelling agent, an oxidizing breaker, a breaker activator that comprises a reducing sugar comprising lactose, and water;
    introducing the aqueous treating fluid composition into a well bore;
    allowing the breaker activator to interact with the oxidizing breaker so as to activate the oxidizing breaker;
    allowing the oxidizing breaker to at least partially depolymerize the polysaccharide gelling agent; and
    allowing the viscosity of the aqueous treating fluid composition to reduce.

2. The method of claim 1 wherein the polysaccharide gelling agent is selected from the group consisting of guar, hydroxypropyl guar, carboxymethyl guar, carboxymethylhydroxypropyl guar, xanthan, cellulose, hydroxyethylcellulose, carboxymethylcellulose, derivatives thereof, and combinations thereof.

3. The method of claim 1 wherein the polysaccharide gelling agent is present in the aqueous treating fluid composition in an amount in the range of from about 0.1% to about 2% by weight of the aqueous treating fluid composition.

4. The method of claim 1 wherein the oxidizing breaker is selected from the group consisting of peroxides, persulfates, perborates, oxyacids of halogens, oxyanions of halogens, derivatives thereof, and combinations thereof.

5. The method of claim 1 wherein the oxidizing breaker is selected from the group consisting of chlorous acid, hypochlorous acid, derivatives thereof, and combinations thereof.

6. The method of claim 1 wherein the oxidizing breaker is present in the aqueous treating fluid composition in an amount in the range of from about 0.005% to about 0.25% by weight of the aqueous treating fluid composition.

7. The method of claim 1 wherein the reducing sugar further comprises a sugar selected from the group consisting of monosaccharide reducing sugars, disaccharide reducing sugars, trisaccharide reducing sugars, derivatives thereof, and combinations thereof.

8. The method of claim 1 wherein the breaker activator is present in the treating fluid composition such that the reducing sugar is present in an amount in the range of from about 0.1% to about 100% by weight of the oxidizing breaker in the aqueous treating fluid composition.

9. The method of claim 1 wherein:
    the reducing sugar further comprises a sugar selected from the group consisting of galactose, fructose, maltose, derivatives thereof, and combinations thereof; and
    the breaker activator is present in the aqueous treating fluid composition such that the reducing sugar is present in an amount in the range of from about 0.1% to about 100% by weight of the oxidizing breaker in the aqueous treating fluid composition.

10. The method of claim 1 wherein the aqueous treating fluid composition further comprises a conventional activator that is selected from the group consisting of cupric ions chelated with ethylenediaminetetraacetic acid, aminocarboxylates, diamines, derivatives thereof, and combinations thereof.

11. The method of claim 10 wherein the conventional activator is present in the aqueous treating fluid composition in an amount in the range of from about 0.01% to about 1% by weight of the aqueous treating fluid composition.

12. The method of claim 1 wherein the aqueous treating fluid composition further comprises an iron salt catalyst.

13. The method of claim 12 wherein the iron salt catalyst is selected from the group consisting of iron(II) chloride, iron(III) chloride, and combinations thereof.

14. The method of claim 12 wherein the iron salt catalyst is present in the aqueous treating fluid composition in an amount in the range of from about 0.1 ppm to about 100 ppm by weight of the aqueous treating fluid composition.

15. A method of creating or enhancing one or more fractures in a subterranean formation penetrated by a well bore comprising:
    providing an aqueous fracturing fluid composition that comprises a polysaccharide gelling agent, an oxidizing breaker, a breaker activator that comprises a reducing sugar comprising lactose, and water;
    introducing the aqueous fracturing fluid composition into the subterranean formation through the well bore under conditions effective to create or enhance at least one fracture in the subterranean formation;
    allowing the breaker activator to interact with the oxidizing breaker so as to activate the oxidizing breaker;
    allowing the oxidizing breaker to at least partially depolymerize the polysaccharide gelling agent; and
    allowing the viscosity of the aqueous fracturing fluid composition to reduce.

16. The method of claim 15 wherein the polysaccharide gelling agent is selected from the group consisting of guar, hydroxypropyl guar, carboxymethyl guar, carboxymethyihydroxypropyl guar, xanthan, cellulose, hydroxyethylcellulose, carboxymethylcellulose, derivatives thereof, and combinations thereof.

17. The method of claim 15 wherein the polysaccharide gelling agent is present in the aqueous fracturing fluid composition in an amount in the range of from about 0.1% to about 2% by weight of the aqueous fracturing fluid composition.

18. The method of claim 15 wherein the oxidizing breaker is selected from the group consisting of peroxides, persulfates, perborates, oxyacids of halogens, oxyanions of halogens, derivatives thereof, and combinations thereof.

19. The method of claim 15 wherein the oxidizing breaker is selected from the group consisting of chlorous acid, hypochlorous acid, derivatives thereof, and combinations thereof.

20. The method of claim 15 wherein the oxidizing breaker is present in the aqueous fracturing fluid composition in an amount in the range of from about 0.005% to about 0.25% by weight of the aqueous fracturing fluid composition.

21. The method of claim 15 wherein the reducing sugar further comprises a sugar selected from the group consisting of monosaccharide reducing sugars, disaccharide reducing sugars, trisaccharide reducing sugars, derivatives thereof, and combinations thereof.

22. The method of claim 15 wherein the breaker activator is present in the aqueous fracturing fluid composition such that the reducing sugar is present in an amount in the range of from about 0.1% to about 100% by weight of the oxidizing breaker in the aqueous fracturing fluid composition.

23. The method of claim 15 wherein:
the reducing sugar further comprises a sugar selected from the group consisting of galactose, fructose, maltose, derivatives thereof, and combinations thereof and
the breaker activator is present in the aqueous fracturing fluid composition such that the reducing sugar is present in an amount in the range of from about 0.1 to about 100% by weight of the oxidizing breaker in the aqueous fracturing fluid composition.

24. The method of claim 15 wherein the aqueous fracturing fluid composition further comprises a conventional activator that is selected from the group consisting of cupric ions chelated with ethylenediaminetetraacetic acid, aminocarboxylates, diamines, derivatives thereof, and combinations thereof.

25. The method of claim 24 wherein the conventional activator is present in the aqueous fracturing fluid composition in an amount in the range of from about 0.01% to about 1% by weight of the aqueous fracturing fluid composition.

26. The method of claim 15 wherein the aqueous fracturing fluid composition further comprises an iron salt catalyst.

27. The method of claim 26 where the iron salt catalyst is selected from the group consisting of iron(II) chloride, iron(III) chloride, and combinations thereof.

28. The method of claim 26 wherein the iron salt catalyst is present in the aqueous fracturing fluid composition in an amount in the range of from about 0.1 ppm to about 100 ppm by weight of the aqueous fracturing fluid composition.

29. The method of claim 15 wherein the aqueous fracturing fluid composition further comprises proppant material.

30. An aqueous treating fluid composition comprising:
a polysaccharide gelling agent;
an oxidizing breaker that comprises chlorous acid and/or hypochlorous acid;
a breaker activator that comprises a reducing sugar;
proppant material; and
water.

31. The aqueous treating fluid composition of claim 30 wherein the polysaccharide gelling agent is selected from the group consisting of guar, hydroxypropyl guar, carboxymethyl guar, carboxymethylhydroxypropyl guar, xanthan, cellulose, hydroxyethylcellulose, carboxymethylcellulose, derivatives thereof, and combinations thereof.

32. The aqueous treating fluid composition of claim 30 wherein the polysaccharide gelling agent is present in the aqueous treating fluid composition in an amount in the range of from about 0.1% to about 2% by weight of the aqueous treating fluid composition.

33. The aqueous treating fluid composition of claim 30 wherein the oxidizing breaker is present in the aqueous treating fluid composition in an amount in the range of from about 0.005% to about 0.25% by weight of the aqueous treating fluid composition.

34. The aqueous treating fluid composition of claim 30 wherein the reducing sugar is selected from the group consisting of monosaccharide reducing sugars, disaccharide reducing sugars, trisaccharide reducing sugars, derivatives thereof, and combinations thereof.

35. The aqueous treating fluid composition of claim 30 wherein the breaker activator is present in the aqueous treating fluid composition such that the reducing sugar is present in an amount in the range of from about 0.1% to about 100% by weight of the oxidizing breaker in the aqueous treating fluid composition.

36. The aqueous treating fluid composition of claim 30 wherein the reducing sugar is selected from the group consisting of galactose, fructose, maltose, lactose, derivatives thereof, and combinations thereof and
the breaker activator is present in the aqueous fracturing fluid composition such that the reducing sugar is present in an amount in the range of from about 0.1 to about 100% by weight of the oxidizing breaker in the aqueous fracturing fluid composition.

37. The aqueous treating fluid composition of claim 30 further comprising a conventional activator that is selected from the group consisting of cupric ions chelated with ethylenediaminetetraacetic acid, aminocarboxylates, diamines, derivatives thereof, and combinations thereof.

38. The aqueous treating fluid composition of claim 37 wherein the conventional activator is present in the aqueous treating fluid composition in an amount in the range of from about 0.01% to about 1% by weight of the aqueous treating fluid composition.

39. The aqueous treating fluid composition of claim 30 further comprising an iron salt catalyst.

40. The aqueous treating fluid of claim 39 wherein the iron salt catalyst is selected from the group consisting of iron(II) chloride, iron(III) chloride, and combinations thereof.

41. The aqueous treating fluid composition of claim 39 wherein the iron salt catalyst is present in the aqueous treating fluid composition in an amount in the range of from about 0.1 ppm to about 100 ppm by weight of the aqueous treating fluid composition.

* * * * *